(12) United States Patent
Adoline et al.

(10) Patent No.: US 7,467,787 B2
(45) Date of Patent: Dec. 23, 2008

(54) COMPRESSION SPRING ROD

(75) Inventors: Jack W. Adoline, Toledo, OH (US); Thomas J. Fischer, Whitehouse, OH (US)

(73) Assignee: Barnes Group Inc., Bristol, CT (US)

( * ) Notice: Subject to any disclaimer, the term of this patent is extended or adjusted under 35 U.S.C. 154(b) by 47 days.

(21) Appl. No.: 10/838,740

(22) Filed: May 4, 2004

(65) Prior Publication Data

US 2004/0207137 A1 Oct. 21, 2004

Related U.S. Application Data

(63) Continuation of application No. 10/056,941, filed on Jan. 28, 2002, now Pat. No. 6,773,002.

(51) Int. Cl.
*F16F 1/12* (2006.01)

(52) U.S. Cl. .................. 267/291; 267/290; 267/168

(58) Field of Classification Search ............ 267/168, 267/286, 289–291, 124, 129 X; 188/312 X, 188/322.11, 322.16
See application file for complete search history.

(56) References Cited

U.S. PATENT DOCUMENTS

| | | | |
|---|---|---|---|
| 571,972 A | 11/1896 | Janney | |
| 1,329,561 A | 2/1920 | Thompson | |
| 2,783,039 A | 2/1957 | Wilson | |
| 3,131,921 A | 5/1964 | Karbowniczek | |
| RE29,545 E | 2/1978 | Deisenroth | |
| 4,148,469 A * | 4/1979 | Geyer | 267/4 |
| 4,651,979 A * | 3/1987 | Freitag et al. | 188/276 |
| 4,693,343 A | 9/1987 | Boyd | |
| 4,962,916 A | 10/1990 | Palinkas | |
| 5,014,004 A | 5/1991 | Kreibich et al. | |
| 5,291,974 A * | 3/1994 | Bianchi | 267/129 |
| 5,360,123 A | 11/1994 | Johnston | |
| 5,482,261 A | 1/1996 | Ortega | |
| 5,511,868 A | 4/1996 | Eftefield | |
| 5,588,509 A * | 12/1996 | Weitzenhof et al. | 188/267.1 |
| 5,620,066 A | 4/1997 | Schuttler | |
| 5,728,174 A * | 3/1998 | Fitzlaff | 267/124 |
| 5,810,339 A | 9/1998 | Kuspert et al. | |
| 5,887,857 A | 3/1999 | Perrin | |
| 5,946,946 A | 9/1999 | Sharp et al. | |

(Continued)

FOREIGN PATENT DOCUMENTS

DE 1627784 7/1967

(Continued)

*Primary Examiner*—Christopher P Schwartz
(74) *Attorney, Agent, or Firm*—Fay Sharpe LLP; Brian E. Turung

(57) ABSTRACT

A compression spring rod for relatively displacing elements attached to end mounts of the rod assembly comprises a housing having a rod member moveable between extended and retracted positions relative thereto, and a first compression spring in the housing surrounded by a second compression spring for biasing the rod member to one of an extended or retracted position relative to the housing. The two springs are oppositely wound, of different length, of different outside diameter, and of different wire diameter whereby, from a compressed condition, the spring rod exerts an expansion force which increases at a linear rate. Two sets of the springs can be arranged for biasing the rod member to a central position relative to the housing.

52 Claims, 10 Drawing Sheets

U.S. PATENT DOCUMENTS

| | | | |
|---|---|---|---|
| 5,984,058 | A | 11/1999 | Danneker |
| 6,026,755 | A | 2/2000 | Long |
| 6,179,099 | B1 | 1/2001 | Koch |
| 6,199,843 | B1 | 3/2001 | DeGrace |
| 6,673,002 | B2 | 1/2004 | Trovinger et al. |
| 6,773,002 | B2 | 8/2004 | Adoline et al. |
| 6,773,003 | B2 | 8/2004 | Dermody, Jr. |

FOREIGN PATENT DOCUMENTS

| | | | |
|---|---|---|---|
| DE | 2722884 | | 6/1980 |
| DE | 3939 118 | | 5/1991 |
| DE | 3939118 | A1 | 5/1991 |
| DE | 195 04 961 | | 8/1996 |
| DE | 200 00 940 | U1 | 5/2000 |
| DE | 200 00940 | | 5/2000 |
| FR | 2 772 855 | | 6/1999 |
| FR | 2772855 | * | 6/1999 |
| GB | 875291 | | 8/1961 |
| GB | 2036247 | | 6/1980 |
| JP | 57-57934 | | 4/1982 |
| JP | 57057934 | | 4/1982 |
| JP | 11-210312 | | 8/1999 |
| JP | 11210312 | | 8/1999 |

* cited by examiner

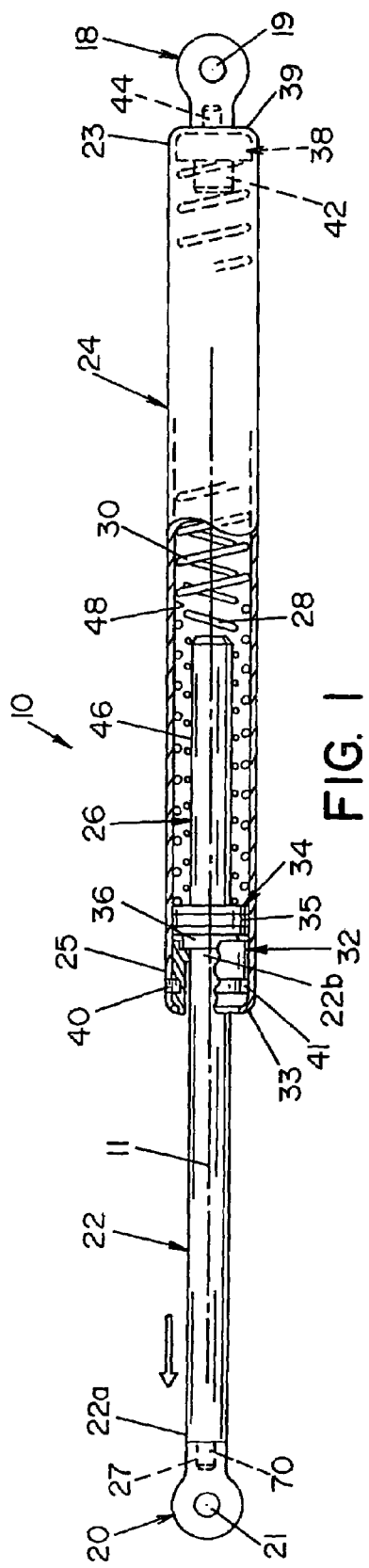
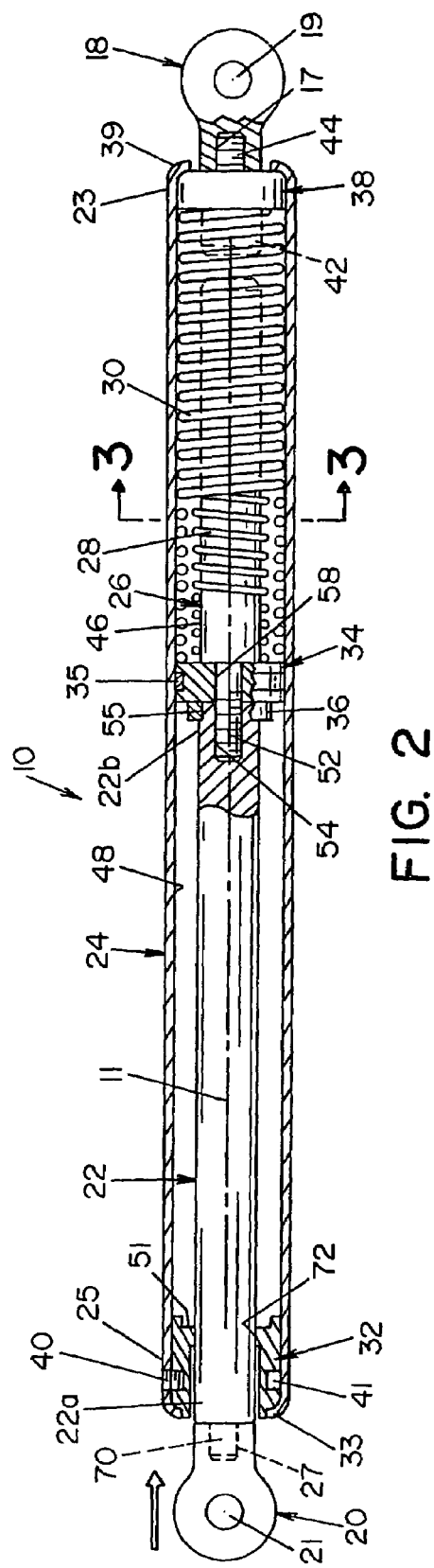

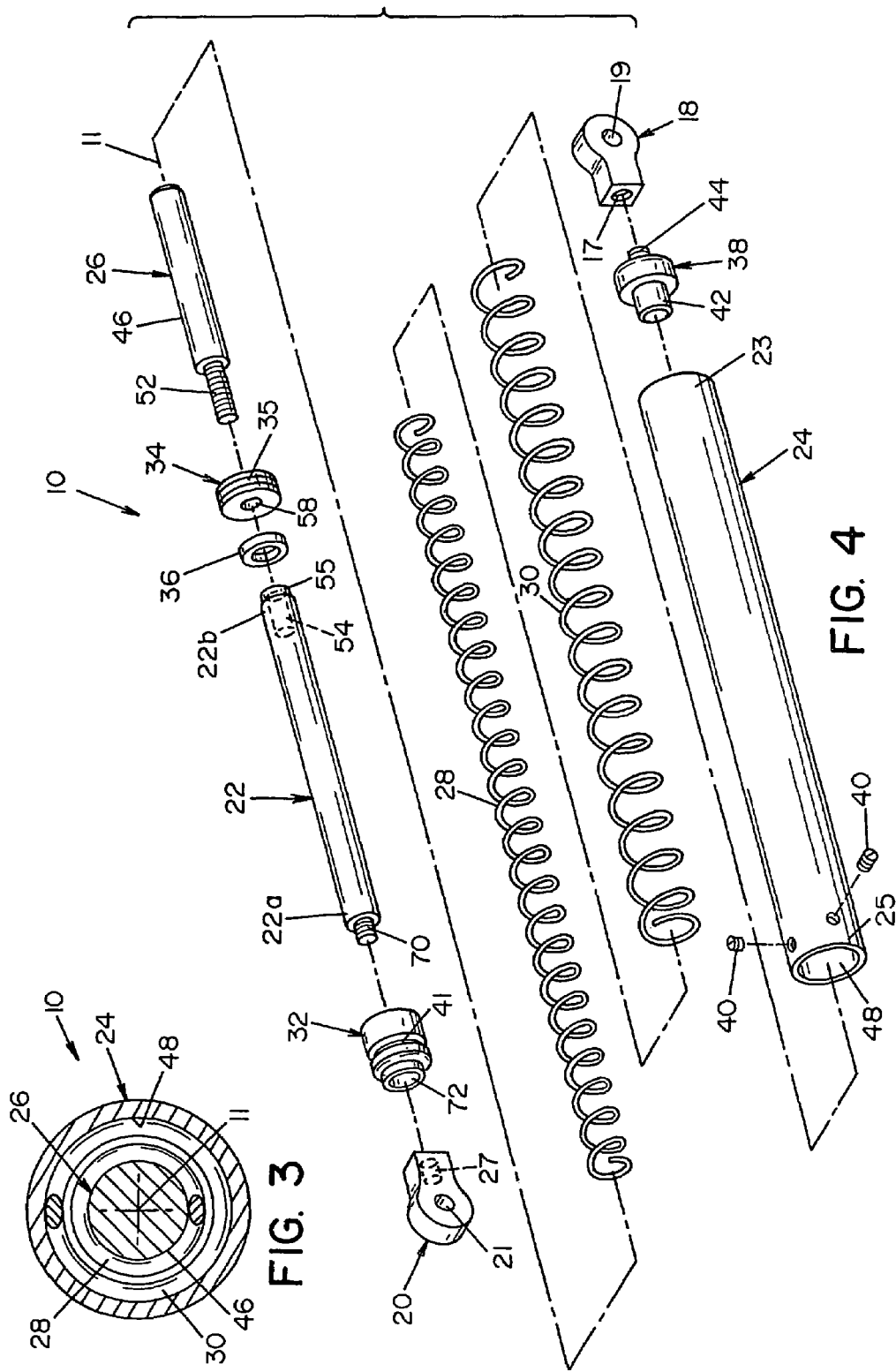

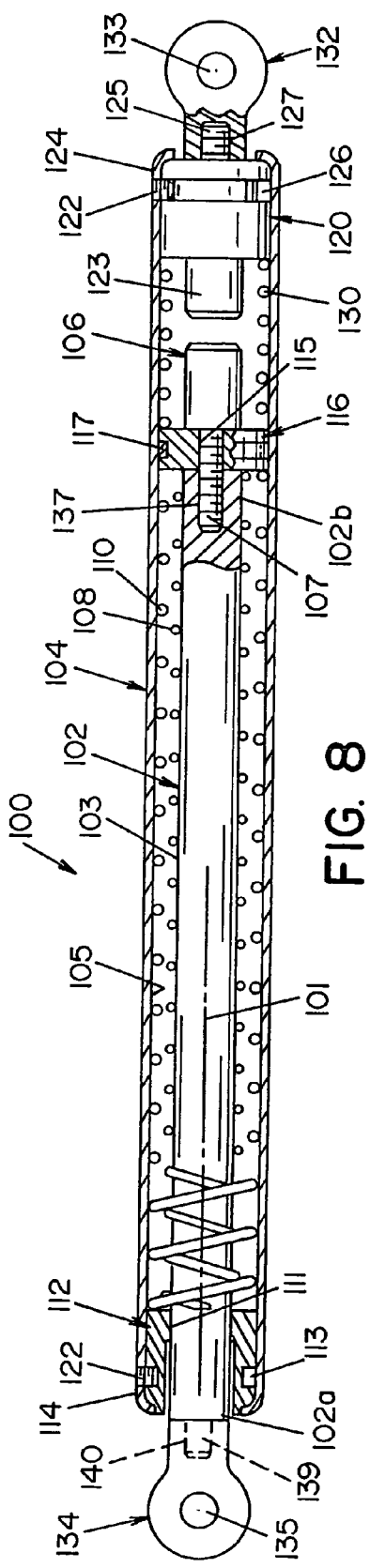
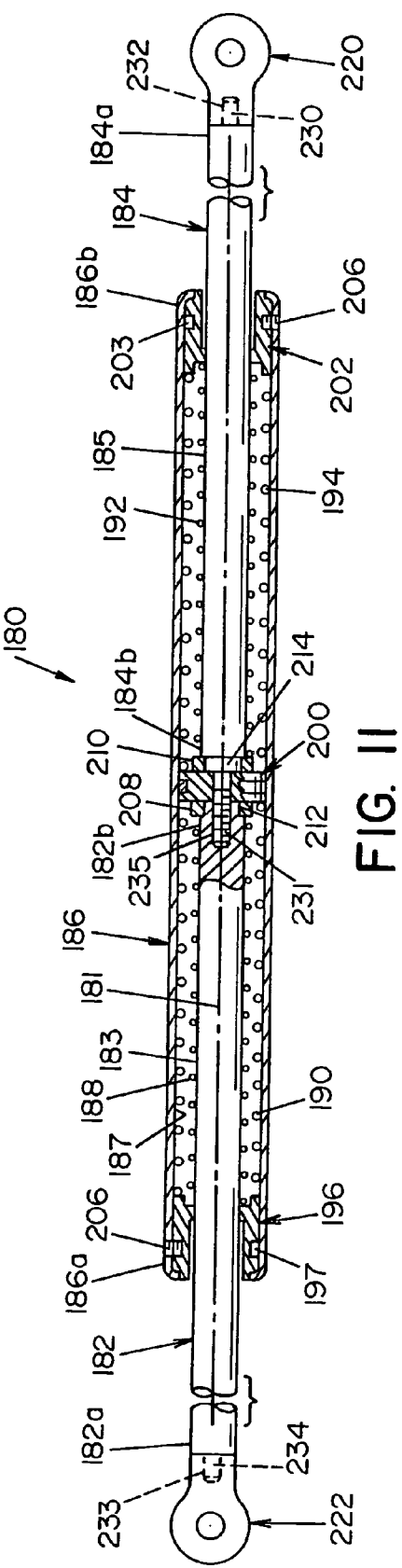
FIG. 8
FIG. 11

COMPRESSION SPRING ROD

This patent application is a continuation of U.S. application Ser. No. 10/056,941 filed Jan. 28, 2002 now U.S. Pat. No. 6,773,002.

BACKGROUND OF THE INVENTION

The present invention relates to compression spring rods, and more particularly, to a spring and rod assembly that exerts an expansional force which increases at a linear rate.

The invention relates to a mechanism for biasing hoods, tops, doors, hinged covers, and other elements from a closed to an open position. The invention involves the use of springs in conjunction with a rod member to exert the driving force on the elements to be displaced. The following patents are incorporated herein by reference as background information with regard to spring mechanisms: U.S. Pat. No. 6,199,843 to DeGrace; U.S. Pat. No. 5,810,339 to Küspert, et al.; and U.S. Pat. No. 4,962,916 to Palinkas.

Compression spring rods are used in various applications, for example, to assist in lifting, opening, and damping. Typical applications include lifting a lid hinged to a stationary base. Other applications include lifting and/or balancing elements for the trunk or hatchback of an automobile. Still another application includes a damping spring for closing a door hinged to a stationary frame. Most applications involve the use of a pneumatic or gas spring to assist the opening motion. Many of these types of compression spring assemblies contain either gas or hydraulic fluid to control forces and piston speeds. Consequently, because these products contain a gas and/or fluid, they are subject to premature failure, due to the leakage of the gas or fluid over time. The leakage results in a loss of control forces and a subsequent loss of spring life.

SUMMARY OF THE INVENTION

The present invention provides an improved compression spring rod which overcomes the above referred-to difficulties and others with regard to such rods heretofore available. More particularly in this respect, a compression spring rod in accordance with the invention is particularly adapted for lifting or pivoting one component relative to another component at a controlled rate. In accordance with one aspect, the invention provides a lift mechanism for hinged covers and the like that operates automatically upon release of the cover, or a lift mechanism for a loaded platform wherein the platform is elevated, progressively, as the load thereon is reduced. Advantageously, the compression spring assembly applies a constant and controlled force to open the cover or lift the platform. The mechanism is able to support significant loads while maintaining strength over a greater number of operating cycles than existing pneumatic or gas spring designs. Further, the invention provides a purely mechanical compression rod assembly that can yield controllable forces over a long period of use and control the spring forces during both extension and compression.

A compression spring rod according to the invention is comprised of multiple compression springs. The compression spring rod assembly includes a rod which is adapted to extend and retract relative to a housing. In one application, for example, the compression springs will build potential force as the springs are compressed, and release that force once the springs are allowed to expand. This extension of the springs imparts a force to the parts connected to the ends of the rod and housing and, advantageously, multiple end configurations can be used to adapt the spring rod to a variety of mounting applications. The compression springs of a spring rod according to the invention are interrelated to produce a linear load versus deflection curve. The encased springs minimize load losses over time, and the mechanism does not contain any fluid or gases within the lift body. This advantageously eliminates the inevitable problem of leakage and subsequent loss of utility.

It is accordingly an outstanding object of the present invention to provide an improved compression spring rod for exerting an operating force on a displaceable member at a controlled rate.

Another object of the invention is the provision of a compression spring rod that supplies a consistent force over an extended period of time and maintains strength over a greater number of cycles compared to compression spring rods heretofore available.

Yet another object of the invention is the provision of a compression spring rod having at least two compression springs interrelated to produce a linear load versus deflection curve.

Yet another object of the invention is the provision of a compression spring rod having at least two compression springs interrelated to minimize load losses over time.

A further object of the invention is the provision of a mechanical compression spring rod assembly that provides an operating force that increases at a linear rate.

Yet a further object of the invention is to provide a mechanical compression spring assembly that can accommodate, selectively, multiple end configurations, thus adapting the assembly for mounting in a wide variety of use applications.

BRIEF DESCRIPTION OF THE DRAWINGS

The foregoing and other objects and advantages will in part be obvious and in part pointed out in the following description taken together with the accompanying drawings in which:

FIG. 1 is a side elevation view, partially in section, of a compression spring rod according to the invention in the extended position;

FIG. 2 is a longitudinal cross section view of the compression spring rod in the compressed position;

FIG. 3 is a cross sectional view taken along line 3-3 of FIG. 2;

FIG. 4 is an exploded perspective view of the component parts of the compression spring rod shown in FIGS. 1-3;

FIG. 8 is a side elevation view, in section, of a spring rod in accordance with a second embodiment of the invention;

FIG. 11 is a side elevation view, in section, of a spring rod in accordance with another embodiment of the invention;

DESCRIPTION OF PREFERRED EMBODIMENTS OF THE INVENTION

Figure 5:
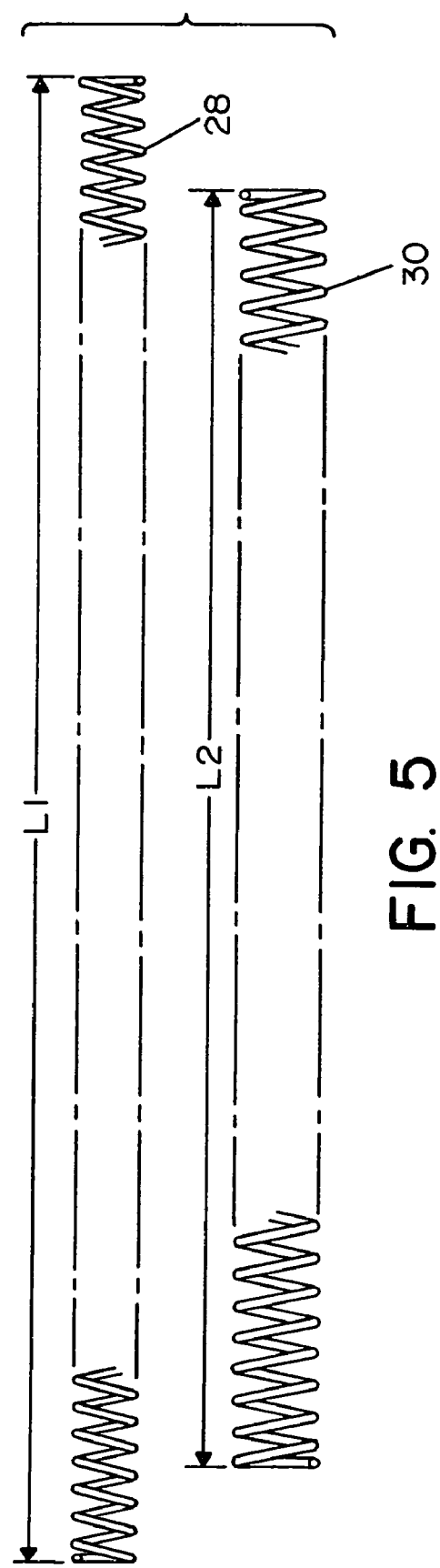
FIG. 5 is a side elevation view of the compression springs of the compression spring rod.

Referring now in greater detail to the drawings, wherein the showings are for the purpose of illustrating preferred embodiments of the invention only, and not for the purpose of limiting the invention, a compression spring rod 10, in accordance with the invention, as shown in FIGS. 1-6, has an axis 11 and includes a rod member 22 which is axially extendable and retractable relative to a one-piece tubular housing 24. Rod 22 has an outer end 22a and an inner end 22b connected to a guide rod 26 as set forth more fully hereinafter. Guide rod 26 extends axially inwardly of inner end 22b of rod 22 and is surrounded by a first compression spring 28 which is supported by the exterior surface 46 of guide rod 26 against buckling. First compression spring 28 is surrounded by a second compression spring 30 which is supported against buckling by the interior surface 48 of housing 24. Alignment of compression springs 28 and 30 relative to one another and axis 11 is maintained by the exterior surface 46 of guide rod 26 in conjunction with the interior surface 48 of housing 24. Housing 24 has a mounting end 23 and an outer or opposite end 25, and compression springs 28 and 30 are axially captured between a tail bushing 38 at mounting end 23 and a guide member 34 mounted between guide rod 26 and the inner end 22b of rod 22 as set forth hereinafter. Tail bushing 38 is supported in housing 24 by bending the endmost portion of the housing radially inwardly to define a retaining flange 39.

Compression spring rod 10 involves the use of a one-piece housing 24 which facilitates smooth movement of lift rod 22 and compression springs 28 and 30 during operation of the spring rod. As shown in the exploded view of FIG. 4, tail bushing 38 includes a neck portion 42 having a diameter sized to be received in the interior of compression spring 28. Tail bushing 38 also has a threaded stud 44 distal to the neck portion 42 which is received in a threaded recess 17 in a mounting element 18. Guide rod 26 includes a threaded stud 52 at the outer end thereof which passes through an opening 58 in guide member 34 and into a threaded bore 54 provided therefor in rod 22. Lift rod 22 passes through an opening 72 through a rod bushing 32 at outer end 25 of housing 24, and has a threaded stud 70 on outer end 22a thereof which is received in a threaded recess 27 provided therefor in a mounting element 20. Mounting elements 18 and 20 have openings 19 and 21 therethrough, respectively, for receiving a variety of different mounting components common in the industry including, for example, pins, bolts, swivels, and the like. Advantageously, the threaded studs 44 and 70 at opposite ends of the spring rod assembly provide for accommodating the use of different mounting elements than those shown so as to modify the assembly for use in a variety of structural environments.

Guide member 34 is slidable in housing 24 and includes a guide ring 35 of suitable material to facilitate such sliding movement. Rod 22 is slidably supported at end 25 of housing 24 by rod bushing 32 which is secured to the housing by a pair of set screws 40 having inner ends received in an annular recess 41 in the rod bushing. Rod bushing 32 is further axially retained in housing 24 by bending the outermost part of end 25 radially inwardly to provide a retaining flange 33. At full extension, rod 22 is cushioned by rod bushing 32 and an impact absorbing metal spring ring 36 received in a recess 55 at inner end 22b of rod 22 adjacent the axially outer face of guide member 34. When rod 22 is fully extended, spring ring 36 engages in a recess 51 in the axially inner end of rod bushing 32. Lubrication can be provided in housing 24 to facilitate the sliding movement of guide member 34 therein. As will be appreciated from the foregoing description, guide member 34 and rod bushing 32 support rod 22 for reciprocation in housing 24 such as to maintain minimal breakaway forces for rod 22. Additionally, guide member 34 and rod bushing 32 keep rod 22 coaxial with axis 11 and decrease the effect of side loading on the assembly.

Compression spring rod 10, through the multiple spring rate characteristics of compression springs 28 and 30, serves to provide smooth extension forces to the movement of lift rod 22 from the retracted to the extended position thereof relative to housing 24. Depending upon the application, the appropriate load versus deflection can be determined and the corresponding physical and elastic properties of the combination of compression springs 28 and 30 can then be ascertained. The compression springs 28 and 30 can each be fabricated from spring material, such as music wire, and, for example, ASTM A228 or 302 stainless steel.

Each compression spring 28 and 30 has a different stress and strain characteristic. If the spring is considered to be a one-dimensional object, the only stress will be extensional (or compressional, which will be the negative of extensional) and the units of stress will be force per unit of extension. Within a range of compression, each spring obeys "Hook's Law", which states that for forces in a defined range, the stretch of a material is proportional to the applied force:

$$F = -k\Delta L$$

The proportionality constant, k, is known as the spring constant with dimensions of force over length, and $\Delta L$ is the amount of compression. The negative sign indicates that the force is in the opposite direction of extension: if the spring is extended, the force tries to restore it to its original length. Likewise, if the spring is compressed ($\Delta L < 0$), the force attempts to expand the spring, again to its original length. The spring constant depends on both physical and elastic properties of the material being stretched. Hook's Law is fairly intuitive at a basic level, and can be illustrated by everyday experience in which it is known that a thin wire will stretch more than a thick wire or rod of the same material when the same stretching force is applied to both. The formula $U = \frac{1}{2}k(\Delta L)^2$, gives the work of extension (U) or alternatively, the amount of potential energy stored in the spring.

Figure 6:
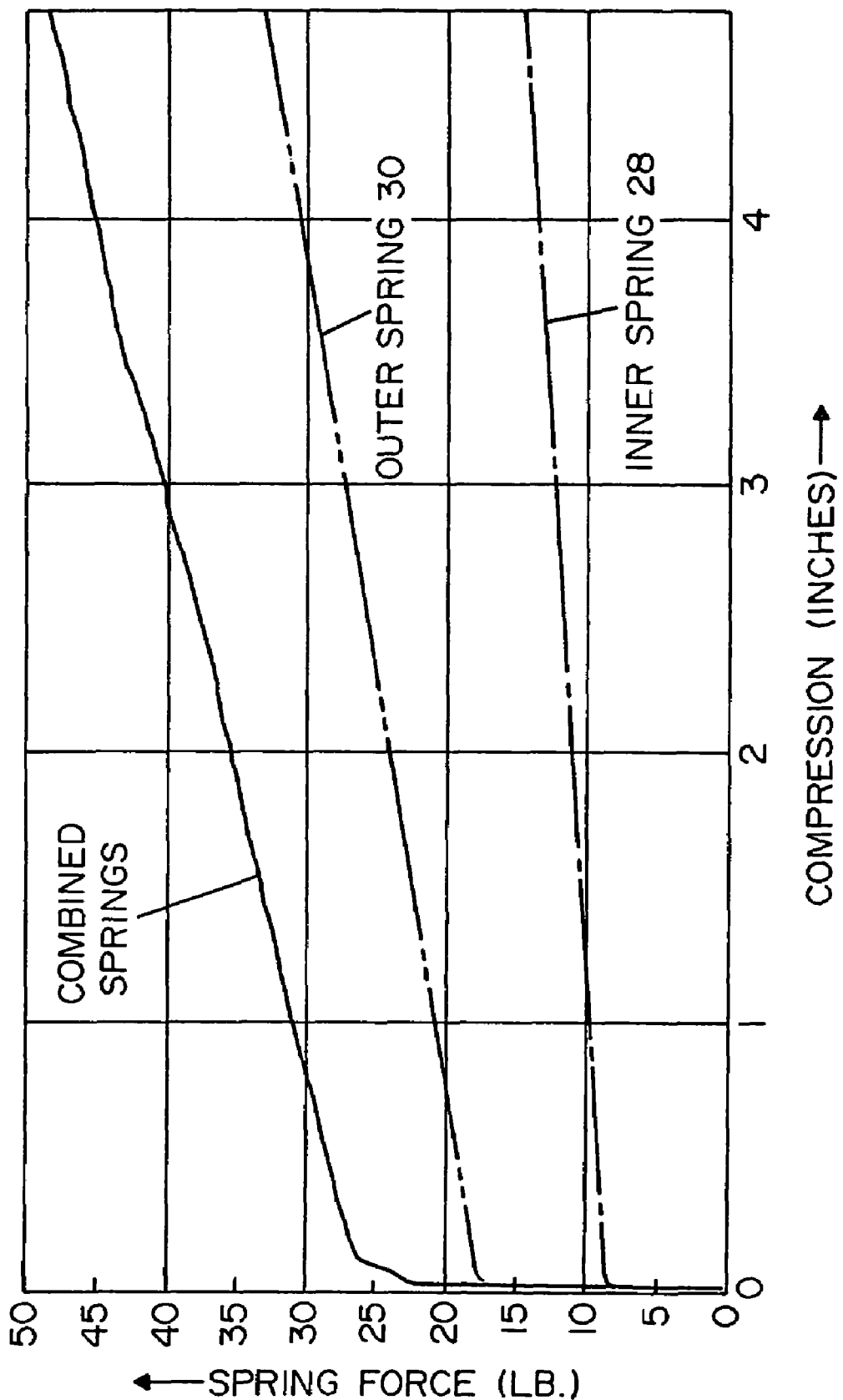
FIG. 6 is a graph illustrating the relationship between spring force and compression of the compression spring rod assembly.

As shown in FIGS. 3 and 5, compression spring 28 has a free length L1 which is greater than the free length L2 of spring 30, and spring 28 has an outer diameter smaller than that of compression spring 30. Also, the wire diameter of spring 28 is less than that of spring 30, and the spring rate of spring 28 is less than that of spring 30. As an example of one particular application, the specific physical characteristics of compression spring 28 are: wire diameter 0.055", inside diameter 0.5444", outside diameter 0.6544", free length 17.2", and a spring rate of 0.95 lbs./inch; and the physical characteristics of compression spring 30 are: wire diameter 0.081", inside diameter 0.675", outside diameter 0.837", free length 13.8", and a spring rate of 3.37 lbs./inch. FIG. 6 displays the load versus deflection curve for compression springs 28 and 30 having the foregoing specifications, and for the combined springs in the assembly shown in FIGS. 1 and 2. It is to be noted that springs 28 and 30 are oppositely wound and that this interrelationship together with the dimensional characteristics of the springs produces the combined linear load versus deflection graph depicted in FIG. 6. The different free lengths, as shown in FIG. 5, of springs 28 and 30 is one component that helps to control the forces and stabilize the guide member 34 and rod 22 during initial displacement thereof from the position shown in FIG. 1 to the position shown in FIG. 2 and during the termination of the movement from the position shown in FIG. 2 to the position shown in FIG. 1. In this respect, the longer spring 28 is, in the free state of the spring 30 shown in FIG. 1, slightly compressed to the length of the latter spring and, therefore, exerts a stabilizing force on the components which eliminates any free play during initial and terminal displacement thereof during use.

Figure 7:
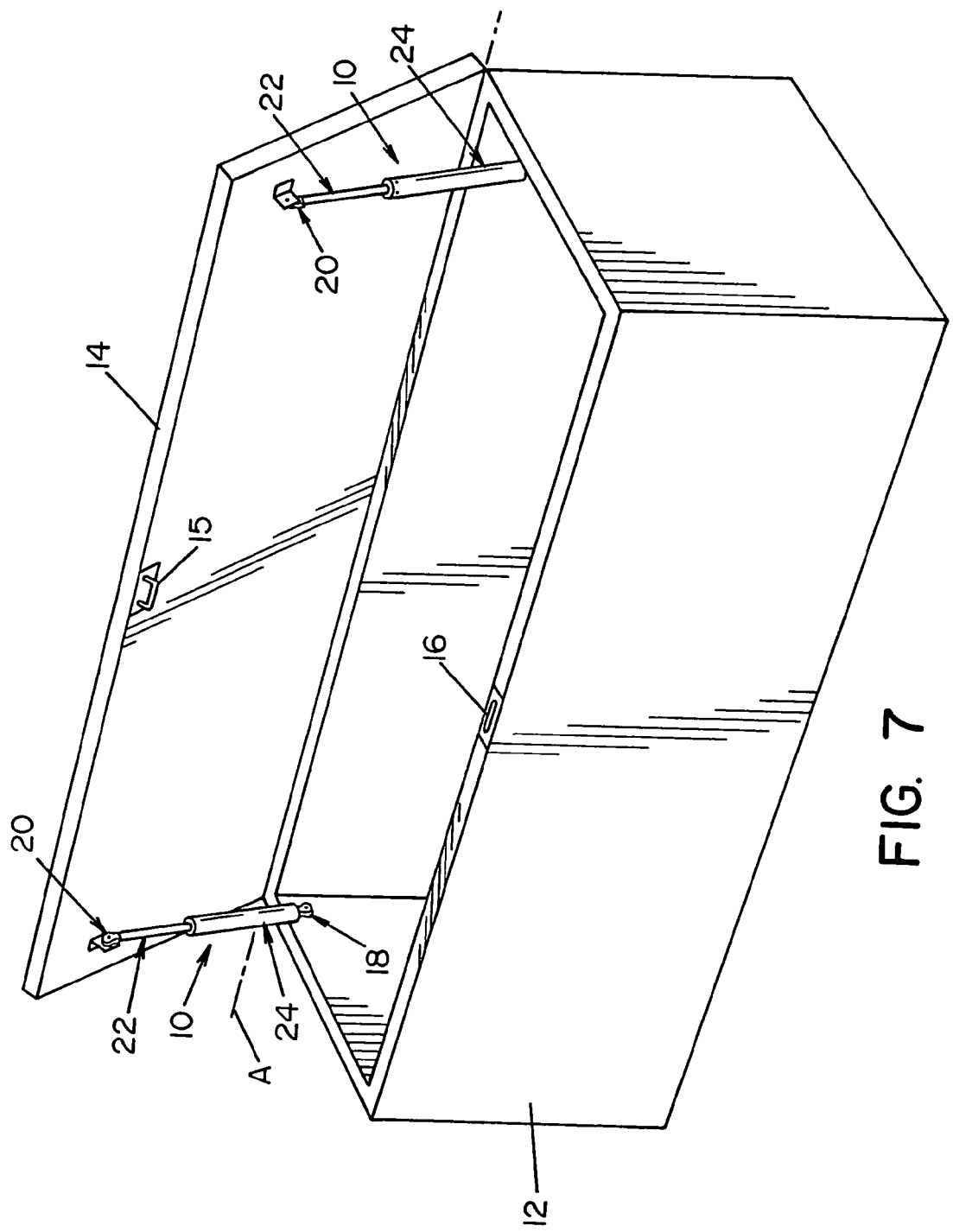
FIG. 7 is a perspective view of a box with a lid pivotable about a horizontal axis and compression spring rod elements shown in FIGS. 1-3 between the box and lid.

FIG. 7 illustrates two compression spring rods 10 according to the invention connected between a box 12 and a lid 14 therefor. While not shown in detail, lid 14 is suitably mounted on box 12, such as by hinges, to be pivotable about an axis A relative thereto. The mounting elements 18 and 20 of compression spring rods 10 are suitably secured to box 12 and lid 14, respectively. A latch 15 is shown on lid 14 for engagement with a keeper 16 on box 12 to releasably hold the lid closed relative to box 12. Latch 15 may be of various types common in the industry, and the method for releasing latch 15 may be by hand, foot, key, remote, etc. Subsequent to releasing the latch 15, compression spring rods 10 automatically extend from the position shown in FIG. 2 to the position as shown in FIG. 1, during which the spring rods 10 expand, releasing the stored compressive force in compression springs 28 and 30 to displace lid 14 from the closed to the open position thereof.

Figure 9:
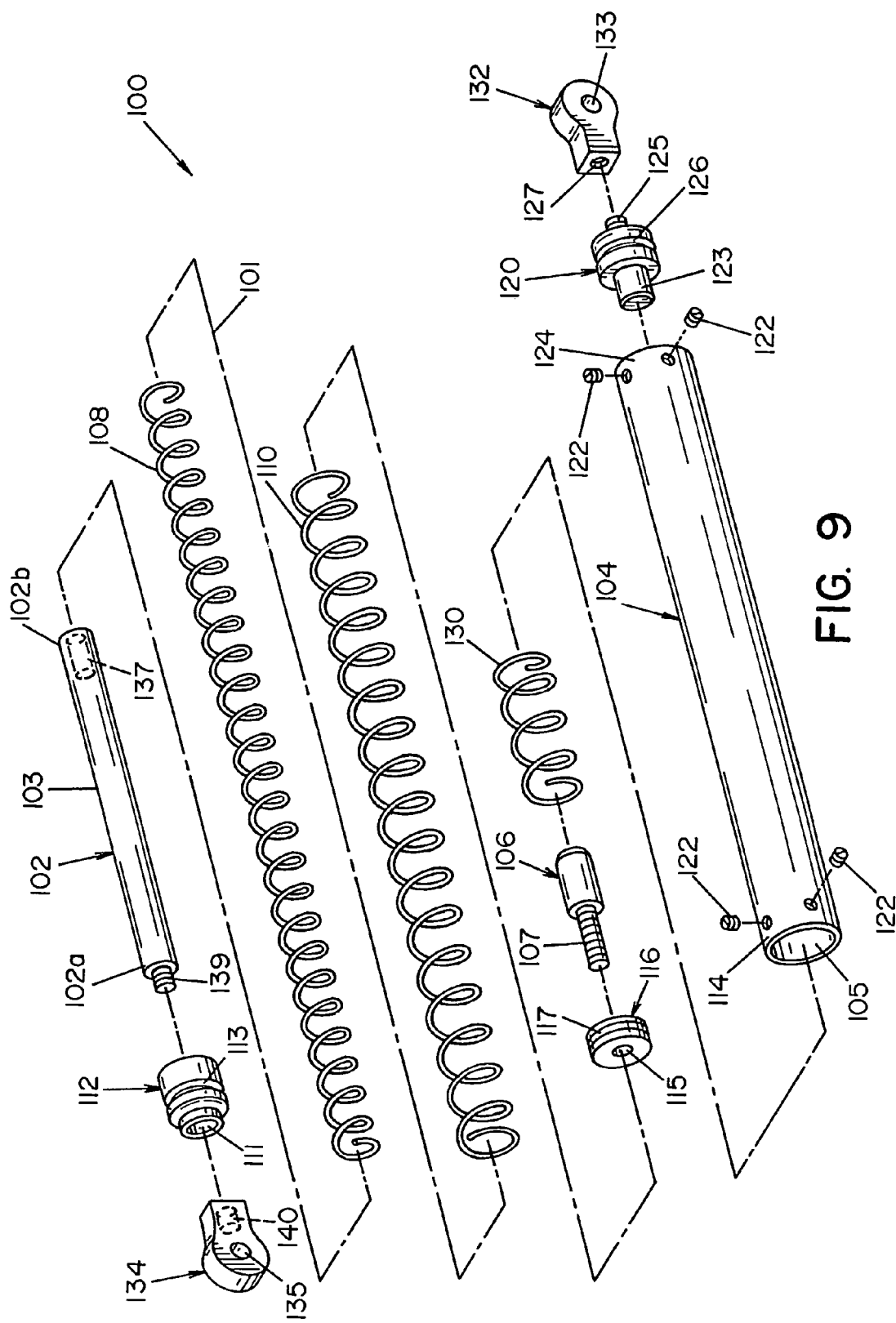
FIG. 9 is an exploded perspective view of the component parts of the compression spring rod shown in FIG. 8.

FIGS. 8 and 9 illustrate another embodiment of a compression spring assembly according to the invention. In this embodiment, compression spring rod 100 has an axis 101 and includes a rod 102 which is axially extendable and retractable relative to a one-piece tubular housing 104. Rod 102 has an outer end 102a and an inner end 102b connected to a guide rod 106 as set forth more fully hereinafter. Guide rod 106 extends axially inwardly of inner end 102b of rod 102. A first compression spring 108 is supported against buckling by the exterior surface 103 of rod 102. Spring 108 is surrounded by a second compression spring 110 which is supported against buckling by the interior surface 105 of housing 104. Coaxial alignment of compression springs 108 and 110 relative to one another and axis 101 is maintained by the exterior surface 103 of rod 102 in conjunction with the interior surface 105 of housing 104. When assembled, compression springs 108 and 110 are axially captured between a rod bushing 112 at end 114 of housing 104 and a guide member 116 secured to inner end 102b of the rod between the latter and guide rod 106. Guide rod 106 includes a threaded stud 107 at the outer end thereof which passes through an opening 115 in guide member 116 and into a threaded bore 137 provided therefor in rod 102. A tail bushing 120 is supported in end 124 of housing 104 by set screws 122 received in an annular recess 126 in the tail bushing 120. For the purpose set forth hereinafter, the component parts of spring rod 100 are cushioned during operation of the compression spring assembly by a cushioning spring 130 which surrounds guide rod 106. Spring 130 is axially captured between the tail bushing 120 at end 124 and the guide member 116. Tail bushing 120 includes a neck portion 123 having a diameter sized to be received in the interior of cushioning spring 130. Tail bushing 120 also has a threaded stud 125 distal to neck portion 123 which is received in a threaded recess 127 in a mounting element 132. Guide member 116 is slidable in housing 104 and includes a guide ring 117 of suitable material to facilitate such sliding movement. Rod 102 is slidably supported at end 114 of housing 104 by rod bushing 112 which is secured to housing 104 by a pair of set screws 122 having inner ends received in an annular recess 113 in bushing 112. Rod 102 passes through an opening 111 in bushing 112 at outer end 114 of housing 104, and has a threaded stud 139 on outer end 102a thereof which is received in a threaded recess 140 provided therefor in a mounting element 134. As will be appreciated from the foregoing description, guide member 116 and rod bushing 112 support rod 102 for reciprocation in housing 104 such as to maintain minimal breakaway forces for rod 102. Mounting elements 132 and 134 have openings 133 and 135 therethrough, respectively, for receiving a variety of different mounting components common in the industry including, for example, pins, bolts, swivels, and the like. Mounting element 132 is fixedly attached to tail bushing 120 for mounting the compression spring assembly to a work supporting surface.

Figure 10:
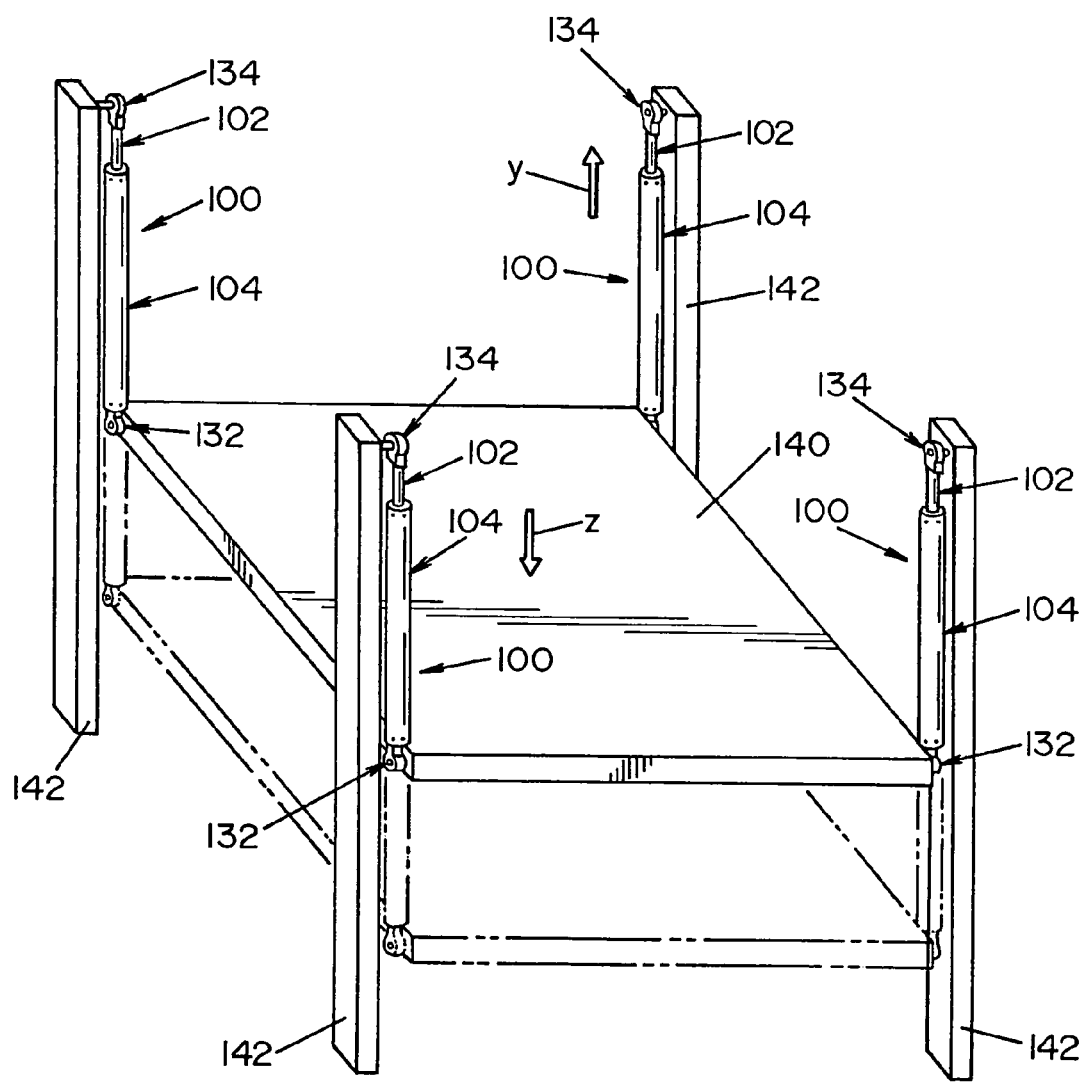
FIG. 10 is a perspective view illustrating a use of the compression spring rod of FIGS. 8 and 9.

FIG. 10 illustrates four compression spring rods 100 each connected between a corresponding fixed support 142 and a platform or work supporting table 140. The spring rods 100, as shown in FIG. 10, are designed to expand in the direction of arrow z in response to a load applied to platform 140, thus compressing springs 108 and 110. Compression springs 108 and 110 then expand and retract the spring rods in the direction of arrow y as the load is progressively removed from platform 140. Compression springs 108 and 110 have the same physical characteristics as compression springs 28 and 30 described in the first embodiment. The arrangement of spring rods 100 and platform 140 as shown in FIG. 10 is suitable, for example, as a progressive load lifter, such as for metal plates. As plates are progressively stacked on platform 140, the spring rods 100 extend in the direction of arrow z, whereby the compression springs 108 and 110 are progressively compressed. As stated, when the springs are compressed ($\Delta L<0$) the resultant force attempts to expand the spring rod to its original length. Thus, as the plates are progressively removed from the platform, the compression springs 108 and 110 expand thereby causing the platform 140 to move in the direction of arrow y. In this manner, the springs provide controlled forces by which the top plate in the stack on the platform remains at a given level as the platform moves first in the z direction and then in the y direction. If the entire load is suddenly removed from the platform, the spring rods retract rapidly and cushioning spring 130 cushions the retracting movement to protect the spring rods against damage. Additionally, it will be appreciated that this embodiment is particularly well suited as a counterbalance system, conveyor chain tensioner, door lift assist, and dampener.

Figure 12:
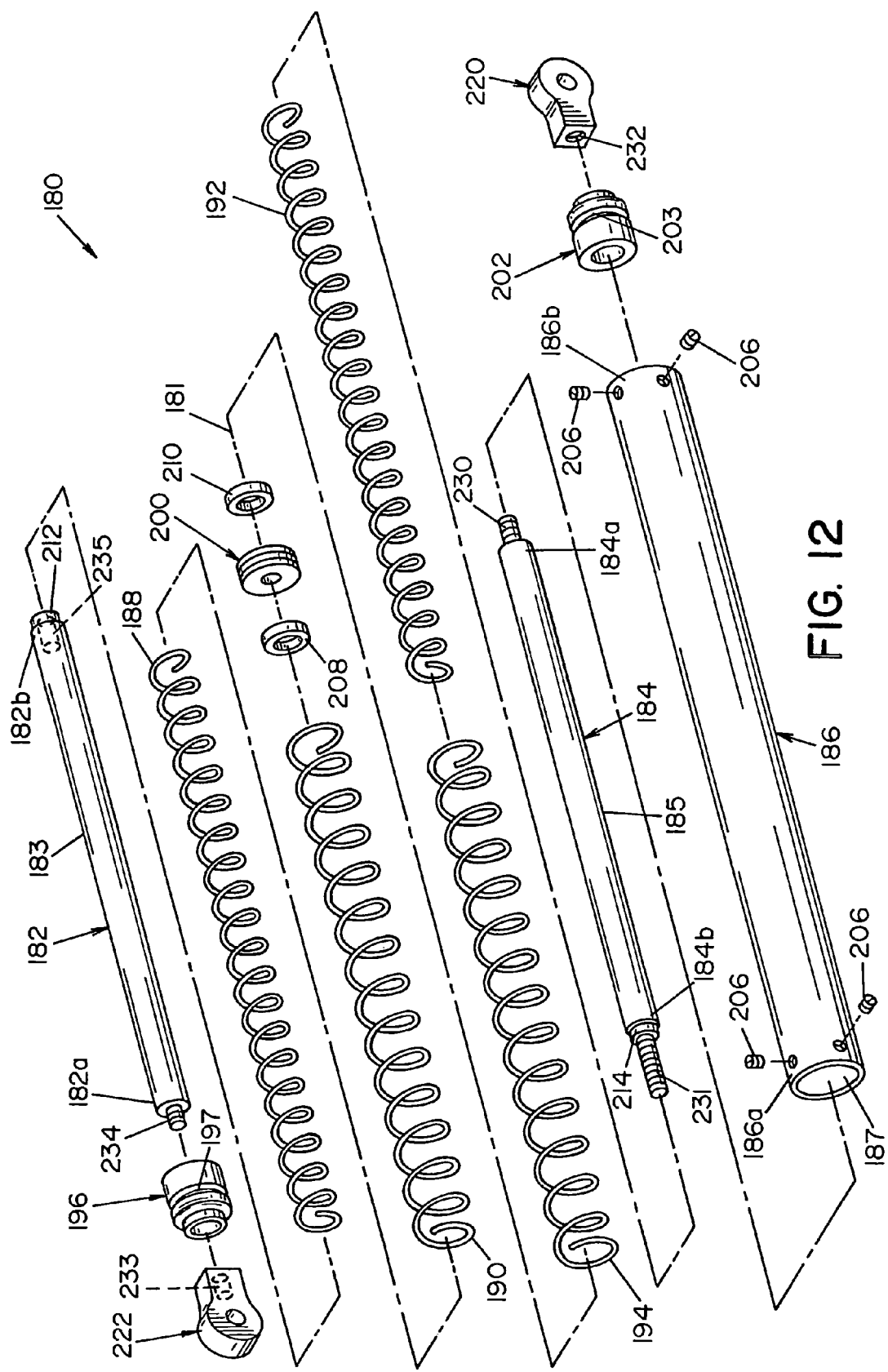
FIG. 12 is an exploded perspective view of the component parts of the compression spring rod shown in FIG. 11; and, FIG. 13 is an illustration of an application of the compression spring rod of FIGS. 11 and 12.

FIGS. 11 and 12 illustrate another embodiment of a compression spring assembly according to the invention. In this embodiment, compression spring rod 180 has an axis 181 and includes two rods 182 and 184 which are alternately axially extendable and retractable together relative to a one-piece tubular housing 186. Rod 182 has an outer end 182a and an inner end 182b and rod 184 has an outer end 184a and an inner end 184b connected to inner end 182b of rod 182 together with a guide member 200 as set forth more fully hereinafter. Rod 182 extends axially inwardly of end 186a of housing 186 and is surrounded by a first compression spring 188 which is supported by the exterior surface 183 of rod 182 against buckling. First compression spring 188 is surrounded by a second compression spring 190 which is supported against buckling by the interior surface 187 of housing 186. Rod 184 extends axially inwardly of opposite end 186b of housing 186 and is surrounded by a third compression spring 192 which is supported by the exterior surface 185 of rod 184 against buckling. Third compression spring 192 is surrounded by a fourth compression spring 194 which is supported against buckling by the interior surface 187 of housing 186. Alignment of compression springs 188, 190, 192, and 194 relative to one another and axis 181 is maintained by the exterior surfaces 183 and 185 of rods 182 and 184, respectively, in conjunction with the interior surface 187 of housing 186. Compression springs 188 and 190 are axially captured between a rod bushing 196 at end 186a and the guide member 200, and compression springs 192 and 194 are axially captured between a rod bushing 202 at end 186b of the housing and the guide member. Rod bushing 196 is supported in housing 186 by set screws 206 at end 186a thereof which extend into an annular recess 197 in bushing 196. Similarly, rod bushing 202 is supported in housing 186 by set screws 206 at end 186b thereof which extend into an annular recess 203 in the bushing. Axial retention of bushings 196 and 202 is further enhanced by bending the corresponding end of housing 186 radially inwardly of the bushings.

The compression spring rod 180 involves the use of a one-piece housing 186 which facilitates smooth movement of rods 182 and 184 and compression springs 188, 190, 192, and 194 during operation of the spring rod. As shown in the exploded view of FIG. 12, rod 184 includes threads 230 and 231 at opposite ends of the rod. Threads 230 are received in a threaded recess 232 in a mounting element 220. Threads 231 pass through an opening in spring ring 210, an opening through guide member 200, and an opening in spring ring 208 and are received in a threaded recess 235 in rod 182. Rod 182 includes threads 234 distal to recess 235, which are received in a threaded recess 233 in a mounting element 222. As will be appreciated from the foregoing description, guide member 200 and rod bushings 196 and 202 support rods 182 and 184, respectively, for reciprocation in housing 186 such as to maintain minimal breakaway forces for rods 182 and 184 in use of the spring assembly.

Spring rod assembly 180 is adapted to apply an extension force, alternately, in axially opposite directions at a controllable rate. At full extension from housing 186, rods 182 and 184 are cushioned by rod bushings 196 and 202, respectively. In addition, impact in the direction of extension is absorbed by metal spring rings 208 and 210 which are received in recesses 212 and 214, respectively, at inner end 182b of rod 182 and inner end 184b of rod 184. Spring rings 208 and 210 are adjacent the axially outer faces of guide member 200 and respectively bottom on rod bushings 196 and 202, but separated by their respective compression springs 188 and 192, upon full extension of the rods in the respective direction of extension. Lubrication can be provided in housing 186 to facilitate the sliding movement of guide member 200 therein.

Figure 13:
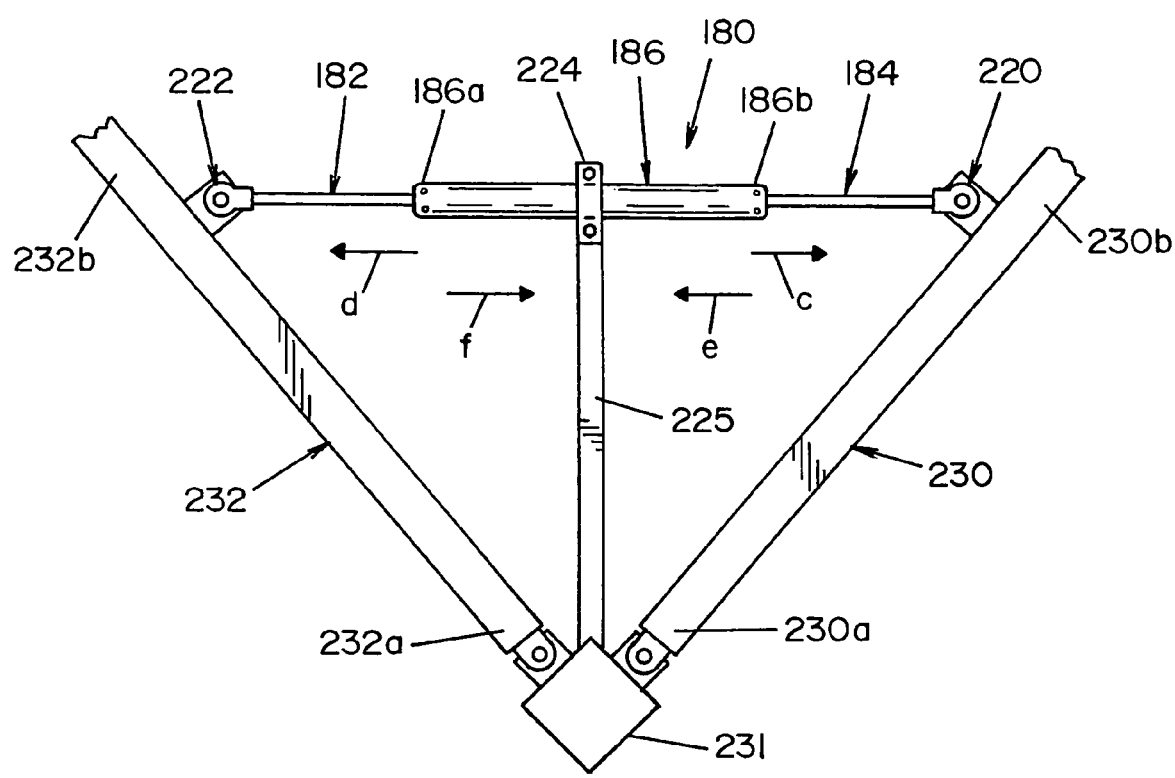

As shown in FIG. 13, spring rod assembly 180 is capable of self-centering a load which, as illustrated by way of example only, is in the form of two workpieces 230 and 232 having ends 230a and 232a pivotally attached to a fixed support member 231. Spring rod 180 has the outer ends of rods 182 and 184 thereof respectively pivotally connected to ends 232b and 230a of the workpieces. Spring rod 180 is supported centrally between workpieces 230 and 232 by a bracket 224 rigidly secured to support member 231 by a support arm 225. The springs of each pair of compression springs 188 and 190 and 192 and 194 have the same physical characteristics as compression springs 28 and 30 described in the first embodiment. In the arrangement shown in FIG. 13, spring rod 180 is a load centering assembly. In this respect, it will be appreciated that if either workpiece 230 or 232 is displaced in the direction of arrow c, rod 184 extends relative to housing 186 and the springs 192 and 194 are compressed. The resultant force of springs 192 and 194 in the direction of arrow e attempts to expand the springs to their original length. It will be appreciated that the opposite is true when either workpiece is displaced in the direction of arrow d. In this respect, springs 188 and 190 are compressed and springs 192 and 194 are totally relaxed. The resultant force in the direction of arrow f attempts to expand springs 188 and 190 to their original length. During return movement of workpieces 230 and 232 to the central position thereof, the relaxed pair of springs cushion the return movement. As with the earlier embodiments, the springs 188 and 190 and 192 and 194 provide controlled forces to self-center workpieces 230 and 232 when either is deflected from the neutral position. It will be appreciated that this embodiment is particularly well suited as a centering device in a steering mechanism, linkage mechanism, gating mechanism, and dampener.

While considerable emphasis has been placed herein on the structures and configurations of the preferred embodiments of the invention, it will be appreciated that other embodiments, as well as modifications of the embodiments disclosed herein, can be made without departing from the principles of the invention. In this respect, it will be appreciated that the spring rod can be used in applications other than those disclosed herein. Similarly, multiple combinations of coaxial and surrounding springs (i.e. three, four, etc.) may be configured to meet the desired load versus deflection for a particular application. Likewise, it will be appreciated that a spring rod according to the invention can be secured to relatively displaceable components in any number of different ways. These and other modifications of the preferred embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

The invention claimed is:

1. A compression spring rod comprising a housing, a rod member, a guide member, a first bushing, and first and second compression springs; said housing having an axis, axially opposite first and second ends, an opening in said first end, and first and second chambers; said rod member positioned substantially coaxial with said housing axis and having an inner end in said housing and an outer end extending axially through said opening in said first end and outwardly of said first end of said housing, said outer end of said rod member including a mounting element; said guide member secured to a portion of said rod member located in said housing, said guide member at least partially separating said first and second chambers in said housing; said first bushing positioned at least closely adjacent to said first end of said housing, said first bushing including a central region opening designed to at least partially support said rod member during axial reciprocation in said housing between fully retracted and fully extended positions; said first and second compression springs each positioned in said second chamber of said housing and extending between said guide member and said second end of said housing, said first and second compression springs substantially coaxial with said housing axis, at least one of said first and second compression springs causing said rod member to move to a substantially fully extended position when no force along said housing axis is applied to said outer end of said rod member, at least one of said first and second compression springs in a partially compressed state when said rod member is in said fully extended position, said first spring having a different free length from said second spring, said first and second compression springs producing a generally linear spring force as said rod member over a majority of a distance said rod member moves when moving from a substantially fully extended position to a substantially fully retracted position.

2. The compression spring rod as defined in claim 1, wherein said free length of said first compression spring is greater than said free length of said second compression spring.

3. The compression spring rod as defined in claim 2, wherein said first and second compression springs are positioned in said second chamber such that said first compression spring has a direction of winding that is different from a direction of winding of said second compression spring.

4. The compression spring rod as defined in claim 3, including a guide rod that is secure to said guide member and extends from said guide member toward said second end of said housing, said guide rod positioned substantially coaxial to said housing axis, said guide rod has a shape and a length to enable at least a portion of said first and second compression spring to surround at least a portion of said guide rod as said rod member reciprocates between said fully retracted and said fully extended positions.

5. The compression spring rod as defined in claim 4, including a tail bushing at least partially positioned in said second end of said housing, said tail bushing has an inner end and an outer end, said inner end located in said housing, said inner end has a face and a neck portion extending outwardly from said face, said neck portion has a shape and a length to enable at least a portion of said first and second compression spring to surround at least a portion of said neck portion as said rod member reciprocates between said fully retracted and said fully extended positions.

6. The compression spring rod as defined in claim 2, wherein said first compression spring has an outside diameter that is less than an outside diameter of said second compression spring, said first compression spring has a wire diameter that is less than a wire diameter of said second compression spring, said first compression spring has a spring rate that is less than a spring rate of said second compression spring.

7. The compression spring rod as defined in claim 6, including a guide rod that is secure to said guide member and extends from said guide member toward said second end of said housing, said guide rod positioned substantially coaxial to said housing axis, said guide rod has a shape and a length to enable at least a portion of said first and second compression spring to surround at least a portion of said guide rod as said rod member reciprocates between said fully retracted and said fully extended positions.

8. The compression spring rod as defined in claim 7, including a mounting element on said outer end of said tail bushing.

9. The compression spring rod as defined in claim 2, including a guide rod that is secure to said guide member and extends from said guide member toward said second end of said housing, said guide rod positioned substantially coaxial to said housing axis, said guide rod has a shape and a length to enable at least a portion of said first and second compression spring to surround at least a portion of said guide rod as said rod member reciprocates between said fully retracted and said fully extended positions.

10. The compression spring rod as defined in claim 9, including a tail bushing at least partially positioned in said second end of said housing, said tail bushing has an inner end and an outer end, said inner end located in said housing, said inner end has a face and a neck portion extending outwardly from said face, said neck portion has a shape and a length to enable at least a portion of said first and second compression spring to surround at least a portion of said neck portion as said rod member reciprocates between said fully retracted and said fully extended positions.

11. The compression spring rod as defined in claim 10, wherein said first and said second compression springs are designed to provide substantially all the spring force on said guide member as said rod member reciprocates between said fully retracted and said fully extended positions.

12. The compression spring rod as defined in claim 2, including a tail bushing at least partially positioned in said second end of said housing, said tail bushing has an inner end and an outer end, said inner end located in said housing, said inner end has a face and a neck portion extending outwardly from said face, said neck portion has a shape and a length to enable at least a portion of said first and second compression spring to surround at least a portion of said neck portion as said rod member reciprocates between said fully retracted and said fully extended positions.

13. The compression spring rod as defined in claim 1, including a guide rod that is secure to said guide member and extends from said guide member toward said second end of said housing, said guide rod positioned substantially coaxial to said housing axis, said guide rod has a shape and a length to enable at least a portion of said first and second compression spring to surround at least a portion of said guide rod as said rod member reciprocates between said fully retracted and said fully extended positions.

14. The compression spring rod as defined in claim 13, including a tail bushing at least partially positioned in said second end of said housing, said tail bushing has an inner end and an outer end, said inner end located in said housing, said inner end has a face and a neck portion extending outwardly from said face, said neck portion has a shape and a length to enable at least a portion of said first and second compression spring to surround at least a portion of said neck portion as said rod member reciprocates between said fully retracted and said fully extended positions.

15. The compression spring rod as defined in claim 14, wherein said first and said second compression springs designed to provide substantially all the spring force on said guide member as said rod member reciprocates between said fully retracted and said fully extended positions.

16. The compression spring rod as defined in claim 15, including a guide ring positioned at least partially about said guide member, said guide ring designed to facilitate a sliding movement of said guide member within said housing as said rod member reciprocates between said fully retracted and said fully extended positions.

17. The compression spring rod as defined in claim 15, including a mounting element on said outer end of said tail bushing.

18. The compression spring rod as defined in claim 1, wherein said first and second compression springs are positioned in said second chamber such that said first compression spring has a direction of winding that is different from a direction of winding of said second compression spring.

19. The compression spring rod as defined in claim 18, wherein said first compression spring has an outside diameter that is less than an outside diameter of said second compression spring, said first compression spring has a wire diameter that is less than a wire diameter of said second compression spring.

20. The compression spring rod as defined in claim 19, including a tail bushing at least partially positioned in said second end of said housing, said tail bushing has an inner end and an outer end, said inner end located in said housing, said inner end has a face and a neck portion extending outwardly from said face, said neck portion has a shape and a length to enable at least a portion of said first and second compression spring to surround at least a portion of said neck portion as said rod member reciprocates between said fully retracted and said fully extended positions.

21. The compression spring rod as defined in claim 1, wherein said first and said second compression springs designed to provide substantially all the spring force on said guide member as said rod member reciprocates between said fully retracted and said fully extended positions.

22. The compression spring rod as defined in claim 21, including a guide ring positioned at least partially about said guide member, said guide ring designed to facilitate a sliding movement of said guide member within said housing as said rod member reciprocates between said fully retracted and said fully extended positions.

23. The compression spring rod as defined in claim 21, including a mounting element on said outer end of said tail bushing.

24. The compression spring rod as defined in claim 1, wherein said first compression spring has an outside diameter that is less than an outside diameter of said second compression spring, said first compression spring has a wire diameter that is less than a wire diameter of said second compression spring, said first compression spring has a spring rate that is less than a spring rate of said second compression spring.

25. The compression spring rod as defined in claim 1, including a tail bushing at least partially positioned in said second end of said housing, said tail bushing has an inner end and an outer end, said inner end located in said housing, said inner end has a face and a neck portion extending outwardly from said face, said neck portion has a shape and a length to enable at least a portion of said first and second compression spring to surround at least a portion of said neck portion as said rod member reciprocates between said fully retracted and said fully extended positions.

26. The compression spring rod as defined in claim 1, including a guide ring positioned at least partially about said guide member, said guide ring designed to facilitate a sliding movement of said guide member within said housing as said rod member reciprocates between said fully retracted and said fully extended positions.

27. A compression spring rod comprising a housing, a rod member, a guide member, first and second bushings, and first and second compression springs; said housing has an axis, axially opposite first and second ends, an opening in said first end, and first and second chambers; said rod member positioned substantially coaxial with said housing axis and has an inner end in said housing and an outer end extending axially through said opening in said first end and outwardly of said first end of said housing, said outer end of said rod member including a mounting element; said guide member secured to a portion of said rod member located in said housing, said guide member at least partially separating said first and second chambers in said housing; said first bushing positioned at least closely adjacent to said first end of said housing, said first bushing including a central region designed to at least partially support said rod member during axial reciprocation in said housing between fully retracted and fully extended positions; said second bushing positioned at least closely adjacent to said second end of said housing; said first and second compression springs each positioned in said second chamber of said housing and extending between said guide member and said second bushing, said first and second compression springs substantially coaxial with said housing axis, at least one of said first and second compression springs in a partially compressed state when said rod member is in said fully extended position, said first spring has a free length that is greater than a free length of said second spring, said first and second compression springs producing a generally linear spring force as said rod member over a majority of a distance said rod member moves when moving from a substantially fully extended position to a substantially fully retracted position, said first and second compression springs positioned in said second chamber such that said first compression spring has a direction of winding that is different from a direction of winding of said second compression spring, said first compression spring has an outside diameter that is less than an outside diameter of said second compression spring, said first compression spring has a wire diameter that is less than a wire diameter of said second compression spring, said first compression spring has a spring rate that is less than a spring rate of said second compression spring.

28. The compression spring rod as defined in claim 27, including a guide rod that is secure to said guide member and extends from said guide member toward said second bushing, said guide rod positioned substantially coaxial to said housing axis, said guide rod has a shape and a length to enable at least a portion of said first and second compression spring to surround at least a portion of said neck portion as said rod member reciprocates between said fully retracted and said fully extended positions.

29. The compression spring rod as defined in claim 28, wherein said second bushing has an inner end and an outer end, said inner end located in said housing, said inner end has a face and a neck portion extending outwardly from said face, said neck portion has a shape and a length to enable at least a portion of said first and second compression spring to surround at least a portion of said neck portion as said rod member reciprocates between said fully retracted and said fully extended positions.

30. The compression spring rod as defined in claim 29, wherein said first bushing includes a cavity designed to telescopically receive at least a portion of an impact-absorbing spring ring as said guide rod is moved to said fully extended position, said impact-absorbing spring ring is positioned between said guide member and said first bushing.

31. The compression spring rod as defined in claim 30, wherein said first and said second compression springs are designed to provide substantially all the spring force on said guide member when said rod member is in said fully retracted position.

32. The compression spring rod as defined in claim 31, including a guide ring positioned at least partially about said guide member, said guide ring designed to facilitate a sliding movement of said guide member within said housing as said rod member reciprocates between said fully retracted and said fully extended positions.

33. The compression spring rod as defined in claim 32, including a mounting element on said outer end of said second bushing.

34. The compression spring rod as defined in claim 33, wherein said first bushing includes an impact-absorbing cavity, said impact-absorbing cavity designed to telescopically receive at least a portion of said guide member when said rod member is in said fully extended position.

35. The compression spring rod as defined in claim 34, wherein said first and second compression springs producing a generally linear spring force as said rod member over substantially the total distance said rod member moves when moving from a substantially fully extended position to a substantially fully retracted position.

36. The compression spring rod as defined in claim 28, wherein said first bushing includes a cavity designed to telescopically receive at least a portion of an impact-absorbing spring ring as said guide rod is moved to said fully extended position, said impact-absorbing spring ring is positioned between said guide member and said first bushing.

37. The compression spring rod as defined in claim 28, wherein said first and said second compression springs designed to provide substantially all the spring force on said guide member when said rod member is in said fully retracted position.

38. The compression spring rod as defined in claim 28, including a guide ring positioned at least partially about said guide member, said guide ring designed to facilitate a sliding movement of said guide member within said housing as said rod member reciprocates between said fully retracted and said fully extended positions.

39. The compression spring rod as defined in claim 28, including a mounting element on said outer end of said second bushing.

40. The compression spring rod as defined in claim 27, wherein said second bushing has an inner end and an outer end, said inner end located in said housing, said inner end has a face and a neck portion extending outwardly from said face, said neck portion has a shape and a length to enable at least a portion of said first and second compression spring to surround at least a portion of said neck portion as said rod member reciprocates between said fully retracted and said fully extended positions.

41. The compression spring rod as defined in claim 40, wherein said first bushing includes a cavity designed to telescopically receive at least a portion of an impact-absorbing spring ring as said guide rod is moved to said fully extended position, said impact-absorbing spring ting is positioned between said guide member and said first bushing.

42. The compression spring rod as defined in claim 41, wherein said first and said second compression springs are designed to provide substantially all the spring force on said guide member when said rod member is in said fully retracted position.

43. The compression spring rod as defined in claim 42, including a guide ring positioned at least partially about said guide member, said guide ring designed to facilitate a sliding movement of said guide member within said housing as said rod member reciprocates between said fully retracted and said fully extended positions.

44. The compression spring rod as defined in claim 43, including a mounting element on said outer end of said second bushing.

45. The compression spring rod as defined in claim 44, wherein said first bushing includes an impact-absorbing cavity, said impact-absorbing cavity designed to telescopically receive at least a portion of said guide member when said rod member is in said fully extended position.

46. The compression spring rod as defined in claim 45, wherein said first and second compression springs produce a generally linear spring force as said rod member over substantially the total distance said rod member moves when moving from a substantially fully extended position to a substantially fully retracted position.

47. The compression spring rod as defined in claim 27, wherein said first bushing includes a cavity designed to telescopically receive at least a portion of an impact-absorbing spring ring as said guide rod is moved to said fully extended position, said impact-absorbing spring ring is positioned between said guide member and said first bushing.

48. The compression spring rod as defined in claim 27, wherein said first and said second compression springs designed to provide substantially all the spring force on said guide member when said rod member is in said fully retracted position.

49. The compression spring rod as defined in claim 27, including a guide ring positioned at least partially about said guide member, said guide ring designed to facilitate a sliding movement of said guide member within said housing as said rod member reciprocates between said fully retracted and said fully extended positions.

50. The compression spring rod as defined in claim 27, including a mounting element on said outer end of said second bushing.

51. The compression spring rod as defined in claim 27, wherein said first bushing includes an impact-absorbing cavity, said impact-absorbing cavity designed to telescopically receive at least a portion of said guide member when said rod member is in said fully extended position.

52. The compression spring rod as defined in claim 27, wherein said first and second compression springs produce a generally linear spring force as said rod member over substantially the total distance said rod member moves when moving from a substantially fully extended position to a substantially fully retracted position.

* * * * *